United States Patent
Chiba et al.

(10) Patent No.: US 7,645,074 B2
(45) Date of Patent: Jan. 12, 2010

(54) FLUID-LUBRICATED TYPE TAPERED ROLLER BEARING DEVICE AND VEHICLE PINION SHAFT SUPPORTING ASSEMBLY

(75) Inventors: Hiroyuki Chiba, Osaka (JP); Hiroki Matsuyama, Nara (JP); Kazutoshi Toda, Osaka (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 289 days.

(21) Appl. No.: 11/411,898

(22) Filed: Apr. 27, 2006

(65) Prior Publication Data
US 2006/0245678 A1    Nov. 2, 2006

(30) Foreign Application Priority Data
Apr. 28, 2005 (JP) .......................... P2005-132358

(51) Int. Cl.
*F16C 33/78* (2006.01)
(52) U.S. Cl. ..................................................... 384/571
(58) Field of Classification Search ................ 384/571, 384/470, 572; 475/246
See application file for complete search history.

(56) References Cited

U.S. PATENT DOCUMENTS

| | | | | |
|---|---|---|---|---|
| 3,318,173 | A | * | 5/1967 | Puidokas ..................... 475/246 |
| 5,711,738 | A | * | 1/1998 | Abe et al. .................... 475/246 |
| 7,175,351 | B2 | * | 2/2007 | Ono et al. .................... 384/571 |
| 2007/0133914 | A1 | * | 6/2007 | Matsuyama et al. ......... 384/470 |

FOREIGN PATENT DOCUMENTS

| | | | |
|---|---|---|---|
| JP | 58-130127 | | 9/1983 |
| JP | 62-100333 | | 6/1987 |
| JP | 1-193411 | | 8/1989 |
| JP | 07-144548 | | 6/1995 |
| JP | 09105450 | A * | 4/1997 |
| JP | 10-089352 | | 4/1998 |
| JP | 10-89353 | | 4/1998 |
| JP | 11-48805 | | 2/1999 |
| JP | 2001-090738 | | 4/2001 |
| JP | 2002-227849 | | 8/2002 |
| JP | 2003-254338 | | 9/2003 |
| JP | 2004-76766 | | 3/2004 |
| JP | 2005-069421 | | 3/2005 |

OTHER PUBLICATIONS

Japanese Office Action dated Aug. 11, 2009 (with English translation).

* cited by examiner

*Primary Examiner*—Thomas R Hannon
(74) *Attorney, Agent, or Firm*—McGinn IP Law Group, PLLC

(57) ABSTRACT

A shielding plate for controlling the entry of oil between an inner ring and an outer ring is provided in the vicinity of an opening between the inner ring and the outer ring which lies a side where oil enters. In addition, a fluid accommodating plate for accommodating therein oil is provided in the vicinity of an opening between the outer ring and the inner ring which lies on a side where oil exits.

7 Claims, 4 Drawing Sheets

FLUID-LUBRICATED TYPE TAPERED ROLLER BEARING DEVICE AND VEHICLE PINION SHAFT SUPPORTING ASSEMBLY

BACKGROUND OF THE INVENTION

The present invention relates to a fluid-lubricated type tapered roller bearing device having an outer ring, an inner ring and tapered rollers. In addition, the invention relates to a vehicle pinion shaft supporting assembly having a pinion shaft such as a differential, transaxle or transfer gearbox.

As a related tapered roller bearing device, there is a tapered roller bearing device in which a face rib is provided on an inner ring in such a manner as to contact large end faces of the tapered rollers. In this tapered roller bearing device, the face rib is formed on the inner ring in such a manner as to contact the large end faces of the tapered rollers, and the large end faces of the tapered rollers is supported by the face rib during the tapered roller bearing device is in operation, so that the tapered rollers are positioned at a predetermined position.

In the related tapered roller bearing device, however, since the tapered rollers and the face rib are rubbed by each other during the operation, there is caused a problem that seizing is caused on the face rib which is in contact with the large end faces of the tapered rollers and on the large end faces of the tapered rollers which are in contact with the face rib.

As a related tapered roller bearing device, there is a tapered roller bearing device which is described in JP-A-11-48805 (Patent Document No. 1). This tapered roller bearing device supports a pinion shaft of a differential. This tapered roller bearing device is designed to receive oil inside a differential case which is splashed up thereagainst by a ring gear of the differential. This tapered roller bearing device is made to receive a large amount of oil in order to eliminate a concern about a fire that may be caused on a motor vehicle having a differential due to seizing of the tapered roller bearing device.

In the tapered roller bearing device, however, while the seizing of the tapered roller bearing device can be prevented in an ensured fashion, the rotational torque of the tapered roller bearing device is increased due to the large amount of oil that is supplied to the tapered roller bearing device, and this leads to a problem that the running cost of the differential is increased to thereby deteriorate the fuel economy (efficiency) of a motor vehicle which is equipped with this differential.

Patent Document No. 1: JP-A-11-48805

SUMMARY OF THE INVENTION

Then, a problem that the invention is to solve is to provide a fluid-lubricated type tapered roller bearing device which can reduce the rotational torque and moreover, can ensure the prevention of occurrence of seizing, in particular, between large end faces of tapered rollers and a face rib of an inner ring thereof and a vehicle pinion shaft supporting assembly including the fluid-lubricated tapered roller bearing device.

With a view to solving the problem, according a first aspect of the invention, there is provided a fluid-lubricated type tapered roller bearing device which has an outer ring, an inner ring and tapered rollers and in which a lubricating fluid flows from one side to the other side in an axial direction so as to enter between the inner ring and the outer ring, the fluid-lubricated type tapered roller bearing device including:

a fluid entry control portion which is provided in the vicinity of an opening between the inner ring and the outer ring which lies on a side where a lubricating fluid flows in for controlling the entry of the lubricating fluid between the inner ring and the outer ring; and a fluid accommodating portion which is provided in the vicinity of an opening between the inner ring and the outer ring which lies on a side where the lubricating fluid flows out for accommodating the lubricating fluid.

According to the first aspect of the invention, since the fluid-lubricated type tapered roller bearing device has the fluid entry control portion for controlling the entry of a lubricating fluid (for example, oil, washing fluid and the like) between the inner ring and the outer ring, the entry of the lubricating fluid between the inner ring and the outer ring can be controlled so as to reduce the amount of the lubricating fluid which enters between the inner ring and the outer ring. Consequently, since only a required minimum amount of lubricating fluid is allowed to enter the interior of the fluid-lubricated type tapered roller bearing device so as to reduce the agitating resistance of lubricating fluid, the rotational torque of the fluid-lubricated type tapered roller bearing device can be reduced. Consequently, the fuel consumption of a motor vehicle equipped with the fluid-lubricated type tapered roller bearing device of the invention can be reduced.

In addition, according to the first aspect of the invention, since the fluid-lubricated type tapered roller bearing device has the fluid accommodating portion which is provided in the vicinity of the opening between the inner ring and the outer ring which lies on the side where the lubricating fluid flows out for accommodating therein the lubricating fluid, at least part of the lubricating fluid that has entered between the inner ring and the outer ring can be accommodated within the fluid accommodating portion. Consequently, since the lubricating fluid can be supplied efficiently to a portion where the large end faces of the tapered rollers are rubbed by a face rib provided on the inner ring at a large diameter side of a coned raceway surface of the inner ring to thereby facilitate the occurrence of seizing therebetween by making use of the rotation on its own axis of each of the tapered rollers at the large end face thereof, the occurrence of seizing on the inner ring and the tapered rollers can be suppressed.

In addition, according to a second aspect of the invention, there is provided a fluid-lubricated type tapered roller bearing device as set forth in the first aspect of the invention, wherein the inner ring is a rotating ring, whereas the outer ring is a stationary ring, wherein the inner ring has a front face rib which contacts small end faces of the tapered rollers, wherein the fluid entry control portion is a shielding plate having a protruding portion which protrudes radially further outwards than the front face rib and further includes a cage which retains the tapered rollers, and wherein the protruding portion of the shielding plate is disposed at a location which is spaced apart an interval from the cage outwards in the axial direction.

In the event that a member is provided on an inner ring which is a rotating ring, in general, the member rotates together with a rotating shaft to which the inner ring is fixed. Among those skilled in the art, it is considered not preferable to provide the member which rotates together with the rotating shaft. Due to such a belief being shared among those skilled in the art, there had existed no idea that a shielding plate is provided on an inner ring which is a rotating ring so as to prevent the entry of lubricating fluid into a bearing. However, the inventor of the invention found from experiments that the provision of a shielding plate on an inner ring which is a rotating ring could remarkably reduce the rotational torque compared to conventional tapered roller bearings.

According to the second aspect of the invention, when compared to conventional tapered roller bearings, the rotational torque can be reduced remarkably. This appears to be because since the shielding plate is disposed on the inner ring which constitutes the rotating ring and hence, is constructed so as to rotate, the lubricating fluid adhering to the shielding plate is scattered radially outwards by means of a centrifugal force applied to the shielding plate, whereby the lubricating fluid is made difficult to enter the inside of the bearing device.

In addition, according to a third aspect of the invention, there is provided a fluid-lubricated type tapered roller bearing device as set forth in the second aspect of the invention, wherein an outside diameter of a distal end of the protruding portion of the shielding plate is equal to or smaller than an inside diameter of an edge portion of a cupped raceway surface of the outer ring which lies on a small diameter side thereof.

According to the third aspect of the invention, since an amount of lubricating fluid that needs to enter the bearing device for lubrication thereof can be ensured, the seizing of the bearing device can be prevented.

Additionally, according to a fourth aspect of the invention, there is provided a fluid-lubricated type tapered roller bearing device as set forth in the second or third aspect of the invention, wherein the interval provided between the protruding portion of the shielding plate and the cage in the axial direction is 3 mm or smaller.

According to the fourth aspect of the invention, the amount of lubricating fluid that enters the inside of the bearing device can be reduced further, and hence, the rotational torque can be reduced further.

In addition, according to a fifth aspect of the invention, there is provided a fluid-lubricated type tapered roller bearing device as set forth in any of the second to fourth aspects of the invention, wherein the inner ring and the shielding plate are formed integrally.

According to the fifth aspect of the invention, the numbers of working manhours and assembling manhours can be reduced.

Additionally, according to a sixth aspect of the invention, there is provided a fluid-lubricated type tapered roller bearing device as set forth in the first aspect of the invention, wherein the inner ring is a rotating ring, whereas the outer ring is a stationary ring, wherein the fluid entry control portion is a shielding plate having a protruding portion which protrudes radially further inwards than an edge portion of a cupped raceway surface of the outer ring which lies on a small diameter side thereof and further includes a cage which retains the tapered rollers, wherein the protruding portion of the shielding plate is disposed at a location which is spaced apart an interval from the cage outwards in the axial direction, and wherein the interval provided between the protruding portion of the shielding plate and the cage in the axial direction is 3 mm or smaller.

According to the sixth aspect of the invention, the amount of lubricating fluid that enters the inside of the bearing device can be reduced, and hence, the rotational torque can be reduced.

In addition, according to a seventh aspect of the invention, there is provided a fluid-lubricated type tapered roller bearing device as set forth in the sixth aspect of the invention, wherein the outer ring and the shielding plate are formed integrally.

According to the seventh aspect of the invention, the numbers of working manhours and assembling manhours can be reduced.

In addition, according to an eighth aspect of the invention, there is provided a fluid-lubricated type tapered roller bearing device as set forth in any of the first to seventh aspects of the invention, wherein the fluid accommodating portion is a fluid accommodating plate having a protruding portion which protrudes further inwards in the radial direction of the outer ring than an edge portion of the cupped raceway surface of the outer ring which lies on a large diameter side thereof and defining a fluid accommodating area which accommodates therein the lubricating fluid inwards in the axial direction of the protruding portion and further includes a cage which retains the tapered rollers, and wherein the protruding portion of the fluid accommodating plate is disposed at a location which is spaced apart an interval from the cage outwards in the axial direction.

According to the eighth aspect of the invention, the lubricating fluid flowing from an upstream side can be accommodated in the fluid accommodating area defined inwards in the axial direction of the protruding portion of the fluid accommodating plate. Consequently, since the lubricating fluid accommodated in the fluid accommodating area can be supplied efficiently to a portion where the large end faces of the tapered rollers are rubbed by a face rib provided on the inner ring at a large diameter side of a coned raceway surface of the inner ring by making use of the rotation on its own axis of each of the tapered rollers at the large end face thereof, the occurrence of seizing on the inner ring and the tapered rollers can be suppressed.

Additionally, according to a ninth aspect of the invention, there is provided a fluid-lubricated type tapered roller bearing device as set forth in the eighth aspect of the invention, wherein an outward end face in the axial direction of the protruding portion of the fluid accommodating plate is situated further inwards in the axial direction than an end face of an edge portion of the inner ring which lies on a large diameter side thereof.

According to the ninth aspect of the invention, since the outward end face in the axial direction of the protruding portion of the fluid accommodating plate is situated further inwards in the axial direction than the end face of the edge portion of the coned raceway surface of the inner ring which lies on the large diameter side thereof, an axial dimension of the tapered roller bearing device can be reduced. In addition, the lubricating fluid can be prevented from flowing from the opening between the inner ring and the outer ring which lies on the side where the lubricating fluid exits into the fluid accommodating area, thereby making it possible to prevent an increase in torque which would otherwise be caused by the lubricating fluid which flows into the fluid accommodating area from the exit side opening.

In addition, according to a tenth aspect of the invention, there is provided a fluid-lubricated type tapered roller bearing device as set forth in the eighth or ninth aspect of the invention, wherein a distal end of the protruding portion of the fluid accommodating plate is situated further inwards in the radial direction than an edge of an area of the cupped raceway surface of the outer ring which contacts outer circumferential surfaces of the tapered rollers which edge lies at a large end of the tapered rollers.

According to the tenth aspect of the invention, since the distal end of the protruding portion of the fluid accommodating plate is situated further inwards in the radial direction than the edge of the area of the cupped raceway surface of the outer ring which contacts the outer circumferential surfaces of the tapered rollers which edge lies at the large end of the tapered rollers, the lubricating fluid can be supplied to the large end faces of the tapered rollers in an ensured fashion. Consequently, seizing can be prevented in an ensured fashion which would otherwise occur on the face rib of the inner ring which lies on the large diameter side thereof and the large end faces of the tapered rollers.

Additionally, according to an eleventh aspect of the invention, there is provided a fluid-lubricated type tapered roller bearing device as set forth in the tenth aspect of the invention, wherein the inner ring has a back face rib which contacts large end faces of the tapered rollers, and wherein the distal end of the protruding portion of the fluid accommodating plate is situated further outwards in the radial direction than the back face rib.

According to the eleventh aspect of the invention, since the distal end of the protruding portion of the fluid accommodating plate is situated further outwards in the radial direction than the back face rib, there is no case where the fluid accommodating plate accommodates lubricating fluid more than required in the fluid accommodating area. Consequently, there is no case where the rotational torque is increased.

In addition, according to a twelfth aspect of the invention, there is provided a fluid-lubricated type tapered roller bearing device as set forth in the eleventh aspect of the invention, wherein the tapered rollers each have a recessed portion substantially at a center of the large end face thereof, and wherein the distal end of the protruding portion of the fluid accommodating plate is situated further outwards in the radial direction than a most outward point in the radial direction of an edge of the recessed portion.

According to the twelfth aspect of the invention, since the distal end of the protruding portion of the fluid accommodating plate is situated further outwards in the radial direction than the most outward point in the radial direction of the edge of the recessed portion, the lubricating fluid is not supplied to the recessed portion where the occurrence of seizing cannot be prevented even though the lubricating fluid is supplied thereto but is able to be supplied efficiently only to where the back face rib on the coned raceway surface of the inner ring which lies on the large diameter side thereof is rubbed by the large end faces of the tapered rollers to thereby facilitate the occurrence of seizing. Consequently, the amount of lubricating fluid in the interior of the bearing device can be suppressed to a required minimum level, thereby making it possible not only to reduce the torque but also to effectively suppress the occurrence of seizing at the portion where the back face rib is rubbed by the tapered rollers.

Additionally, according to a thirteenth aspect of the invention, there is provided a vehicle pinion shaft supporting assembly including:

a case;

a differential mechanism which is provided inside the case and which includes a ring gear;

a pinion shaft having a pinion gear which meshes with the ring gear of the differential mechanism; and a fluid-lubricated type tapered roller bearing device as set forth in any of Claims 1 to 12 which rotatably supports the pinion shaft.

According to the thirteenth aspect of the invention, since the vehicle pinion shaft supporting assembly includes the fluid-lubricated type tapered roller bearing device of the invention, the rotational torque of the bearing which supports the pinion shaft can be reduced, thereby making it possible to reduce the fuel consumption of a motor vehicle equipped with the vehicle pinion shaft supporting assembly of the invention. In addition, the seizing of the bearing which supports the pinion shaft can be suppressed.

ADVANTAGES OF THE INVENTION

According to the fluid-lubricated type tapered roller bearing device of the invention, the entry of lubricating fluid into the interior of the bearing device can be suppressed, thereby making it possible to reduce the amount of lubricating fluid in the interior of the bearing device. Consequently, the agitating resistance of lubricating fluid can be reduced, and the rotational torque of the fluid-lubricated type taper rolling bearing device can be reduced, thereby making it possible to reduce the fuel consumption of a motor vehicle or the like which is equipped with the fluid-lubricated type tapered roller bearing device of the invention.

In addition, according to the invention, since the fluid accommodating portion for accommodating therein the lubricating fluid is provided in the vicinity of the opening which lies on the side where the lubricating fluid flows out, at least part of the lubricating fluid that has entered the interior of the bearing device can be accommodated within the fluid accommodating portion. Consequently, since the lubricating fluid can be supplied efficiently to the portion where the large end faces of the tapered rollers and the face rib provided on the inner ring at the large diameter side of the coned raceway surface thereof are rubbed by each other to thereby facilitate the occurrence of seizing therebetween by making use of the rotation on its own axis of each of the tapered rollers at the large end face thereof, the occurrence of seizing on the inner ring and the tapered rollers can be suppressed.

DETAILED DESCRIPTION OF PREFERRED EMBODIMENTS

Hereinafter, embodiments according to the invention will be described with reference to the accompanying drawings.

First Embodiment

Figure 1:
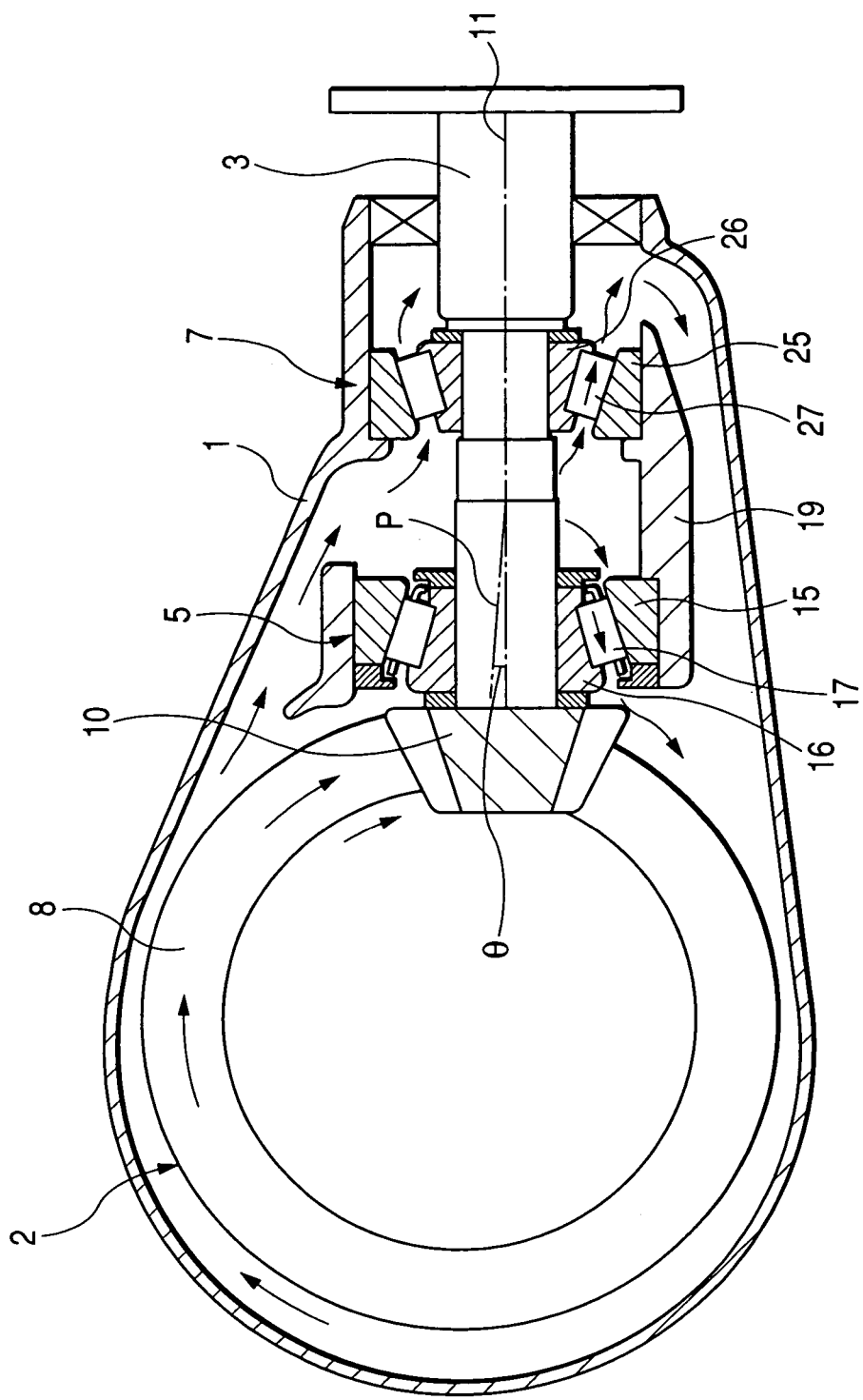
FIG. 1 is a sectional view of a differential constituting one embodiment of a vehicle pinion shaft supporting assembly of the invention which is taken along a vertical direction thereof while including a center axis of a pinion shaft of the differential.

FIG. 1 is a sectional view of a differential as an embodiment of a vehicle pinion shaft supporting assembly according to the invention, which is taken along a vertical direction thereof while including a center axis 11 of a pinion shaft 3 of the differential. Note that in FIG. 1, arrows indicate the flow of oil which is an example of a lubricating fluid.

This differential includes a case 1, a differential mechanism 2, a pinion shaft 3, a fluid-lubricated type tapered roller bearing device 5 (hereinafter, referred to simply as a tapered roller bearing device 5) according to a first embodiment of the invention, and a tapered roller bearing 7.

The differential mechanism 2 is provided in the case 1. The differential mechanism 2 is made up of a ring gear 8, side gears (not shown) and the like, and the ring gear 8 meshes with a pinion gear 10 on the pinion shaft 3. The differential mechanism 2 is designed to receive power from a drive shaft via the pinion gear 10 of the pinion shaft 3 so as to properly adjust a difference in rotational speed between two axles (not shown) which are disposed to extend from the differential mechanism 2 to both sides thereof in a perpendicular direction relative to the surface of a sheet of paper showing FIG. 1, respectively.

The tapered roller bearing device 5 includes an outer ring 15, an inner ring 16, and tapered rollers 17. The outer ring 15 is fixedly fitted in an inner wall 19 in the case 1, whereas the inner ring 16 is fixedly fitted on the pinion shaft 3. The tapered rollers 17 are disposed in a plural number at substantially constant and equal intervals in a circumferential direction in such a state that they are retained between a cupped raceway surface on the outer ring 15 and a coned raceway surface on the inner ring 16 by a cage. The tapered roller bearing device 5 is disposed at a head side end portion of the pinion shaft 3, that is, a pinion gear 10 side end portion of the pinion shaft 3 so as to rotatably support the pinion shaft 3.

On the other hand, the tapered roller bearing 7 includes an outer ring 25, an inner ring 26 and tapered rollers 27. The tapered rollers 27 are disposed in a plural number at substantially constant and equal intervals in a circumferential direction in such a state that they are retained between a cupped raceway surface on the outer ring 25 and a coned raceway surface on the inner ring 26 by a cage (not shown). The tapered roller bearing 7 is disposed at a tail side end portion of the pinion shaft 3, that is, a portion of the pinion shaft 3 which is further apart from the pinion gear 10 than the portion where the tapered roller bearing device 5 is disposed so as to rotatably support the pinion shaft 3.

The differential is disposed between an engine, not shown, and the axles of road wheels which are placed at a lower position than the engine, and in the differential, the height of one end of the pinion shaft 3 which is opposite to the other pinion gear 10 side end is made higher than that of the other pinion gear 10 side end thereof. To be specific, a nose angle which is an angle made between the center axis 11 of the pinion shaft 3 and a horizontal plane P is set to a predetermined set nose angle θ.

Figure 2:
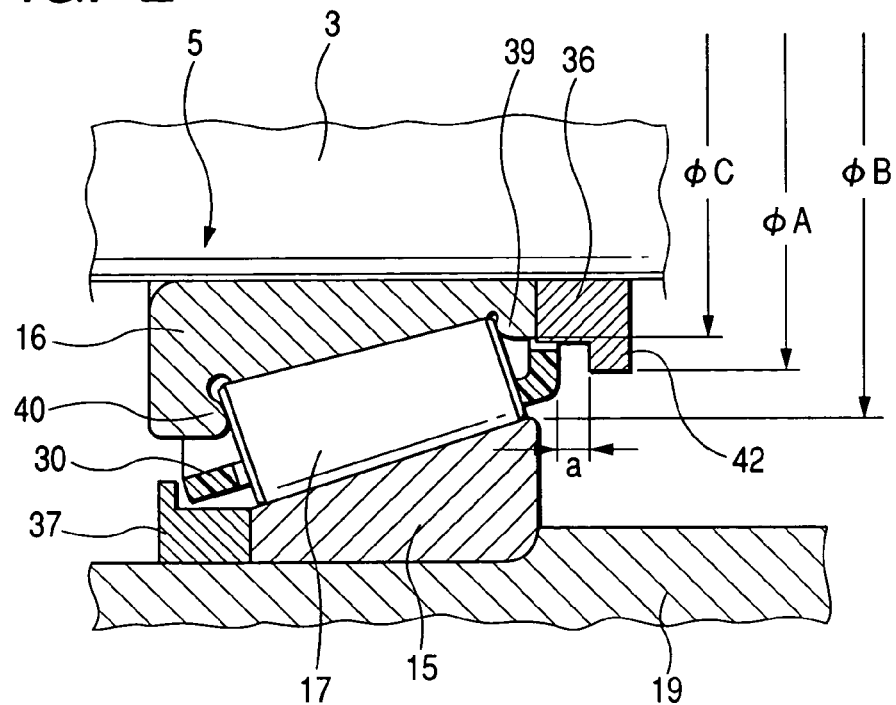
FIG. 2 is an enlarged sectional view showing a portion of a tapered roller bearing device shown in FIG. 1 which lies vertically lower than the central axis of the pinion shaft.

FIG. 2 is an enlarged sectional view showing a portion of the tapered roller bearing device 5 shown in FIG. 1 which lies vertically lower than the central axis 11 of the pinion shaft 3.

As shown in FIG. 2, the tapered roller bearing device 5 includes the outer ring 15, the inner ring 16, the plurality of tapered rollers 17, the retainer 30 which retains the tapered rollers 17 between the cupped raceway surface of the outer ring 15 and the coned raceway surface of the inner ring 16, an annular shielding plate 36 which constitutes an example of a fluid entry control portion and an annular fluid accommodating plate 37 which constitutes an example of a fluid accommodating portion.

The inner ring 16 is a rotating ring having the coned raceway surface and is fixedly fitted on the pinion shaft 3. The outer ring 15 is a stationary ring having the cupped raceway surface and is fixedly fitted in the inner wall 19. The inner ring 16 has a primary collar or face rib 39 which is formed at a small diameter side edge portion of the coned raceway surface thereof in such a manner as to contact small end faces of the tapered rollers 17 and a back face rib 40 which is formed at a large diameter side edge portion of the coned raceway surface thereof in such a manner as to contact large end faces of the tapered rollers 17. As shown in FIG. 1, the tapered roller bearing device 5 is used on condition that oil flows in from an opening lying on a small end face side of the tapered roller 7.

The shielding plate 36 is disposed for the purpose of controlling the entry of oil between the outer ring 15 and the inner ring 16. As shown in FIG. 2, the shielding plate 36 is fixed directly to the pinion shaft 3 (or may be fixed indirectly thereto via a member) in such a manner as to be brought into axial abutment with an end face of the front face rib 39 at the small diameter side of the coned raceway surface of the inner ring 16. The shielding plate 36 is made to rotate in synchronism with the pinion shaft 3. The shielding plate 36 has a protruding portion 42 which protrudes radially further outwards than the front face rib 39 of the inner ring 16. In other words, the outside diameter $\phi A$ of the protruding portion 42 is made to be a dimension equal to or larger than the outside diameter $\phi C$ of the front face rib 39 at the small diameter side of the inner ring 16 (the small diameter side of the coned raceway surface of the inner ring 16). In addition, the outside diameter $\phi A$ of the protruding portion 42 is made to be equal to or smaller than the inside diameter $\phi B$ of a small diameter side edge portion of the cupped raceway surface of the outer ring 15.

In addition, the protruding portion 42 is disposed at a location which is spaced apart an interval (a gap) a from the cage 30 in an axial direction of the inner ring 16. The aforesaid interval a is set to be 3 mm or smaller.

Note that in the event that the outside diameter of the protruding portion of the shielding plate is made smaller than the outside diameter of the front face rib at the small diameter side of the coned raceway surface of the inner ring, the controlling effect to control the entry of oil is reduced, and hence, the effect to reduce the rotational torque is also reduced. On the contrary, in the event that the outside diameter of the protruding portion of the shielding plate is made larger than the inside diameter of a small diameter side inner circumferential edge portion of the cupped raceway surface of the outer ring, almost no oil is allowed to enter the tapered roller bearing device, whereby contact portions of both the bearing rings (the inner ring and the outer ring) and the tapered rollers are subjected to insufficient lubrication, leading to the occurrence of failure or seizing of the relevant contact portions. Additionally, irrespective of the dimension of the outside diameter of the protruding portion of the shielding plate, in the event that the axial interval between the protruding portion of the shielding plate and the cage is made larger than 3 mm, the control effect to control the entry of oil is reduced, and the effect to reduce the rotational torque is also reduced.

Figure 3:
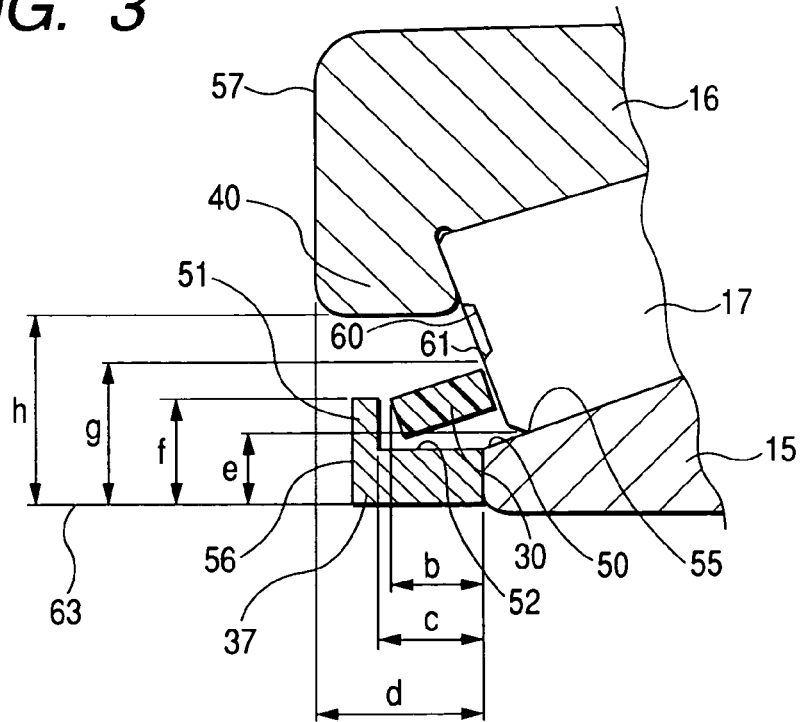
FIG. 3 is an enlarged sectional view showing the vicinity of an oil exit side of outer and inner rings shown in the sectional view of FIG. 2.

FIG. 3 is an enlarged sectional view showing the vicinity of an oil exit side of the outer ring 15 and the inner ring 16 shown in the sectional view of FIG. 2.

As shown in FIG. 3, the fluid accommodating plate 37 is disposed axially outwards of a large diameter side edge portion 50 of the cupped raceway surface of the outer ring 15 in such a manner as to be in abutment with the edge portion 50. The fluid accommodating plate 37 is fixedly fitted in the inner wall 19 (refer to FIG. 1). The fluid accommodating plate 37 has a protruding portion 51 which protrudes radially further inwards than the large diameter side edge portion 50 of the cupped raceway surface of the outer ring 15. A fluid accommodating area 52 is formed axially inwards of the protruding portion 51 of the fluid accommodating plate 37. The protruding portion of the fluid accommodating plate 37 is disposed at a location which is spaced apart an interval from the case outwards in the axial direction. An axially outward end face 56 of the protruding portion of the fluid accommodating plate 37 is located axially further inwards than an end face of a large diameter side edge portion of the coned raceway surface of the inner ring 16.

In addition, a distal end of the protruding portion 51 of the fluid accommodating plate 37 is located radially further inwards than an edge 55 of the cupped raceway surface of the outer ring 15 which contacts outer circumferential surfaces of the tapered rollers 17 which edge 55 lies at a large end of the tapered rollers 17. As has been described above, the inner ring 16 has the back face rib 40 which contacts the large end faces of the tapered rollers 17. The distal end of the protruding portion 51 of the inner ring 16 is located radially further outwards than the back face rib 40.

The tapered rollers 17 each have a recessed portion 60 which is a relief facilitating finishing work in the large end face thereof. The distal end of the protruding portion 51 of the fluid accommodating plate 37 is located radially further outwards than a most outward point 61 in the radial direction of an edge of the recessed portion 60. As shown in FIG. 3, when assuming that a distance between an axially outward point on an edge portion of the cage 30 which lies on a side where oil exits (or which faces the large end faces of the tapered rollers 17) is b(cm), a distance between the large diameter side end face of the cupped raceway surface of the outer ring 15 and an axially inward end face of the protruding portion 51 of the fluid accommodating plate 37 is c(cm), and a distance between the large diameter side end face of the cupped raceway surface of the outer ring 15 and the large diameter side end face 57 of the coned raceway surface of the inner ring 16 is d(cm), the following relationship results; $b<c<d$.

In addition, in the sectional view shown in FIG. 3, when assuming that a distance between a radially outward edge 63 (a straight line which is substantially in parallel with a center axis of the outer ring 15) of the fluid accommodating plate 37 and a portion of the outer ring 15 where the large end face of the tapered roller 17 contacts the outer ring 15 is e(cm), a distance between the edge 63 and the distal end of the protruding portion 51 of the fluid accommodating plate 37 is f(cm), a distance between the edge 63 and the most outward point 61 in the radial direction of the edge of the recessed portion 60 is g(cm), and a distance between the edge 63 and the back face rib 40 at the large diameter side of the coned raceway surface of the inner ring 16 is h(cm), the following relationship results; $e<f<g<h$.

According to the tapered roller bearing device 5 of the first embodiment, since the outside diameter φA of the protruding portion 42 of the shielding plate 36 is made equal to or larger than the outside diameter φC of the front face rib 39 which lies at the small diameter side of the coned raceway surface of the inner ring 16 and is made equal to or smaller than the inside diameter φB of the small diameter side edge portion of the cupped raceway surface of the outer ring 15 and the axial gap a between the protruding portion 40 and the end portion of the cage 30 is made 3 mm or smaller, the entry of oil can be limited, and the agitating resistance can be reduced remarkably.

In addition, according to the tapered roller bearing device 5 of the first embodiment, oil flowing from the upstream side can be accommodated in the fluid accommodating area 52 defined axially inwards of the protruding portion 51 of the fluid accommodating plate 37. Consequently, the oil accommodated in the fluid accommodating area 52 can efficiently be supplied between the large end faces of the tapered rollers 17 and the back face rib 40 at the large diameter side of the coned raceway surface of the inner ring 16 so as to suppress the occurrence of seizing on the inner ring 16 and the tapered rollers 17.

Additionally, according to the tapered roller bearing device 5 of the first embodiment, since the axially outward end face 56 of the protruding portion 51 of the fluid accommodating plate 37 is situated further inwards in the axial direction than the large diameter side end face 57 of the coned raceway surface of the inner ring 16, the axial dimension of the tapered roller bearing device 5 can be reduced. In addition, the entry of oil from the opening between the inner ring 16 and the outer ring 15 which lies at the side where oil flows out into the fluid accommodating area 52 can be prevented, thereby making it possible to prevent an increase in rotational torque which is attributed to the entry of undesired oil from the oil exit side opening.

Additionally, according to the tapered roller bearing device 5 of the first embodiment, since the distal end of the protruding portion 51 of the fluid accommodating plate 37 is situated further inwards in the radial direction than the edge 55 of the area of the cupped raceway surface of the outer ring 15 which contacts the outer circumferential surfaces of the tapered rollers 17 which edge 55 lies at the large end of the tapered rollers 17, oil can be supplied to the large end faces of the tapered rollers 17 in an ensured fashion. Consequently, seizing can be prevented in an ensured fashion which would otherwise occur at where the back face rib 40 at the large diameter side of the coned raceway surface of the inner ring 16 is rubbed or ground by the large end faces of the tapered rollers 17.

In addition, according to the tapered roller bearing device 5 of the first embodiment, the distal end of the protruding portion 51 of the fluid accommodating plate 37 is situated further outwards in the radial direction than the back face rib 40, there occurs no case where oil is accommodated more than required in the fluid accommodating area 52. Consequently, there occurs no case where the rotational torque is increased.

Additionally, according to the tapered roller bearing device 5 of the first embodiment, since the distal end of the protruding portion 51 of the fluid accommodating plate 37 is situated further outwards in the radial direction than the most outward point 61 in the radial direction of the edge of the recessed portion 60 of the tapered roller 17, oil is not supplied to the recessed portion 60 where the occurrence of seizing cannot be prevented even though oil is supplied thereto but is able to be supplied efficiently only to where the back face rib 40 on the coned raceway surface of the inner ring 16 which lies on the large diameter side thereof is rubbed by the large end faces of the tapered rollers 77 to thereby facilitate the occurrence of seizing. Consequently, the amount of oil in the interior of the bearing device can be suppressed to a required minimum level, thereby making it possible not only to reduce the torque but also to effectively suppress the occurrence of seizing at the portion where the back face rib is rubbed by the tapered rollers.

Additionally, according to the differential of the embodiment, since it includes the tapered roller bearing device 5 of the invention, the rotational torque of the bearing which supports the pinion shaft 3 can be reduced, thereby making it possible to reduce the fuel consumption of a motor vehicle equipped with the differential of the invention. In addition, the seizing of the bearing which supports the pinion shaft 3 can be suppressed.

Note that in the tapered roller bearing device 5 of the first embodiment, while the protruding portion 42 is formed at the axially outward position on the shielding plate 36, in this invention, the protruding portion may be formed at other locations on the shielding plate than the axially outward position. In addition, in the tapered roller bearing device 5 of the first embodiment, while the protruding portion 42 extends straight substantially in the radially inward direction, in this invention, the protruding portion may extend obliquely substantially in the radially inward direction.

In addition, in the tapered roller bearing device 5 of the first embodiment, while the shielding plate 36 is disposed in such a manner as to be brought into abutment with the end face of the front face rib 39 formed at the small diameter side of the coned raceway surface of the inner ring 16, in this invention, a gap may exist in the axial direction of the inner ring between the shielding plate and the end face of the front face rib formed at the small diameter side of the coned raceway surface of the inner ring, and the shielding plate may not be in abutment with the end face of the front face rib formed at the small diameter side of coned raceway surface of the inner ring. Additionally, a member may be disposed between the shielding plate and the end face of the front face rib at the small diameter side of the coned raceway surface of the inner ring.

In addition, in the tapered roller bearing device 5 of the first embodiment, while the fluid entry control portion is the shielding plate 36, in this invention, the fluid entry control portion may be an oil entry side end portion of the cage which extends towards the inner ring side in a labyrinth fashion. In the event that the oil entry side end portion of the cage is formed into such a shape, a radial gap between a radially inward portion of the oil entry side edge portion of the cage and the inner ring can be narrowed so as to control the entry of oil.

Additionally, in the tapered roller bearing device 5 of the first embodiment, while the inner ring 16 has the front face rib 39 at the small diameter side of the coned raceway surface thereof, in this invention, the inner ring may be formed into a shape which has no such face rib at the small diameter side of the coned raceway surface thereof. As this occurs, for example, when the shielding plate is adopted as the fluid entry control portion, the shielding portion has, needless to say, a protruding portion which protrudes radially further outwards than the small diameter side edge portion of the coned raceway surface of the inner ring. In addition, also in this case, needless to say, the axial distance between the protruding portion and the cage is preferably set to be 3 mm or smaller, and the protruding portion is preferably located radially further inwards than the small diameter side edge portion of the cupped raceway surface of the outer ring.

In addition, in the tapered roller bearing device 5 of the first embodiment, while the fluid accommodating plate 37 is the annular member, in this invention, the fluid accommodating plate does not have to be the annular member but may be, for example, a semi-annular member or the like which resides only to correspond to a vertically lower half portion of the annular member.

Additionally, in the tapered roller bearing device 5 of the first embodiment, the fluid accommodating portion is the fluid accommodating plate 37, in this invention, the fluid accommodating portion may be an oil exit side end portion of the cage which extends towards the outer ring side while being bent towards the outer ring side. In the event that the oil exit side end portion of the case is formed into such a shape, oil can be reserved on the periphery of the bent portion of the cage, so as to supply oil so reserved to the portion where the inner ring is rubbed or ground by the large end faces of the tapered rollers.

In addition, in the differential of the embodiment, while the tapered roller bearing device 5 of the invention is applied only to the pinion gear side tapered roller bearing, in the differential of the invention, the fluid-lubricated type tapered roller bearing device of the invention may be applied to at least one of the two tapered roller bearings which support the pinion shaft. In addition, in the event that one of the bearings which support the pinion shaft is a tapered roller bearing while the other is a ball bearing, the fluid-lubricated type tapered roller bearing device of the invention may only have to be applied to the tapered roller bearing.

Additionally, in the embodiment, while the vehicle pinion shaft supporting assembly including the tapered roller bearing device 5 of the invention is the differential, the vehicle pinion shaft supporting assembly including the tapered roller bearing device 5 of the invention may be a transaxle or a transfer gearbox.

Second Embodiment

Figure 4:
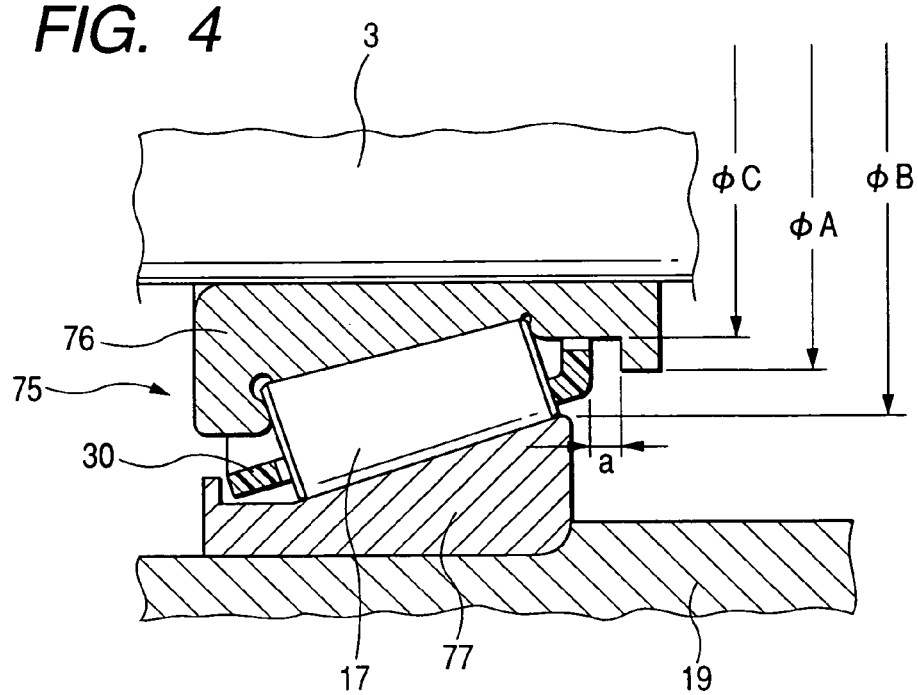
FIG. 4 is an axial sectional view of a tapered roller bearing device of a second embodiment of the fluid-lubricated tapered roller bearing device of the invention which corresponds to FIG. 2.

FIG. 4 is an axial sectional view of a tapered roller bearing device 75 of a second embodiment of the fluid-lubricated tapered roller bearing device of the invention which corresponds to FIG. 2.

The tapered roller bearing device 75 of the second embodiment differs from the tapered roller bearing device 5 of the first embodiment in that the tapered roller bearing device 75 has an inner ring 76 having a shape into which the inner ring 16 and the shielding plate 36 of the first embodiment are integrated and an outer ring 77 having a shape into which the outer ring 15 and the fluid accommodating plate 37 of the first embodiment are integrated.

In the tapered roller bearing device 75 of the second embodiment, like reference numerals are imparted to like constituent portions to those of the tapered roller bearing device 5 of the first embodiment, so as to omit the description thereof. In addition, in the tapered roller bearing device 75 of the second embodiment, the description of similar function and advantage and modified examples to those of the tapered roller bearing device 5 of the first embodiment will be omitted, and hence, only different configurations and function and advantage from those of the tapered roller bearing device 5 of the first embodiment will be described.

As is described above, the inner ring 76 of the tapered roller bearing device 75 of the second embodiment has the shape into which the inner ring 16 and the shielding plate 36 of the first embodiment are integrated. In addition, the outer ring 77 of the tapered roller bearing device 75 of the second embodiment has the shape into which the outer ring 15 and the fluid accommodating plate 37 of the first embodiment are integrated.

According to the tapered roller bearing device 75 of the second embodiment, since the inner ring 76 has the shape into which the inner ring 16 and the shielding plate 36 of the first embodiment are integrated, while the outer ring 77 has the shape into which the outer ring 15 and the fluid accommodating plate 37 of the first embodiment are integrated, the numbers of working manhours and assembling manhours can be reduced in the production process.

Third Embodiment

Figure 5:
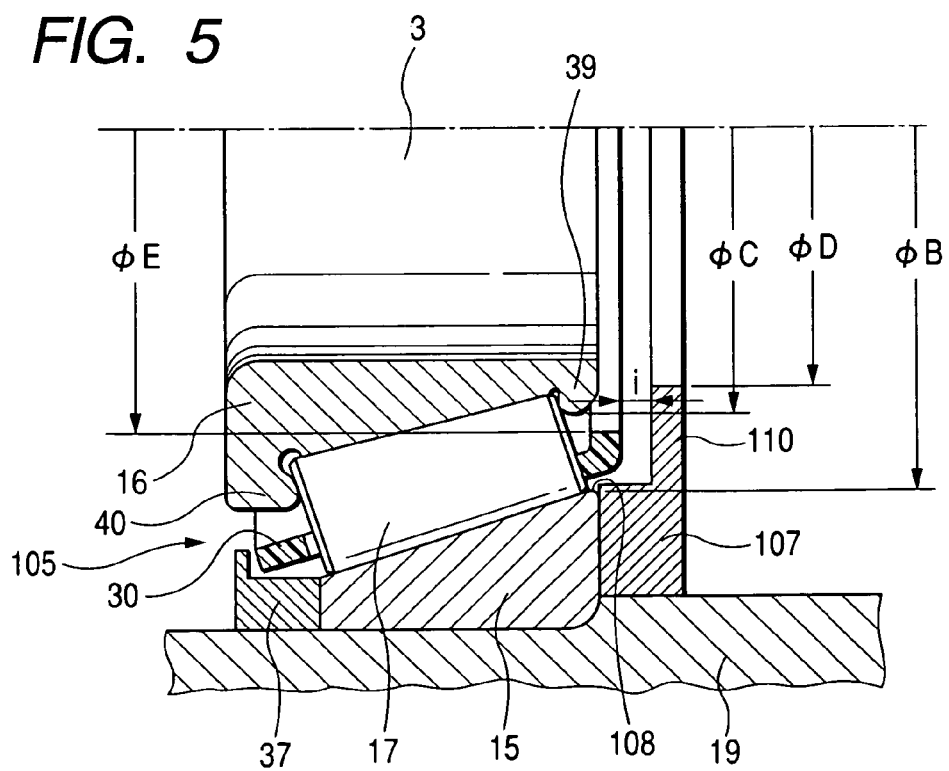
FIG. 5 is an axial sectional view of a tapered roller bearing device of a third embodiment of the fluid-lubricated tapered roller bearing device of the invention which corresponds to FIG. 2.

FIG. 5 is an axial sectional view of a tapered roller bearing device 105 of a third embodiment of the fluid-lubricated tapered roller bearing device of the invention which corresponds to FIG. 2.

In the tapered roller bearing device 105 of the third embodiment, like reference numerals are imparted to like constituent portions to those of the tapered roller bearing device 5 of the first embodiment, so as to omit the description thereof. In addition, in the tapered roller bearing device 105 of the third embodiment, the description of similar function and advantage and modified examples to those of the tapered roller bearing device 5 of the first embodiment will be omitted, and hence, only different configurations and function and advantage from those of the tapered roller bearing device 5 of the first embodiment will be described.

In the tapered roller bearing device 105 of the third embodiment, a shielding plate 107 as an example of the fluid entry control portion is fixedly fitted in an inner wall 19 which is fixed to an outer ring 15. Specifically speaking, the shielding plate 107 is fixedly fitted in the inner wall 19 in such a state that it is in abutment with an end face of a small diameter side end portion of a cupped raceway surface of the outer ring 15.

The shielding plate 107 has a protruding portion 110 which protrudes radially further inwards than the small diameter side end portion of the cupped raceway surface of the outer ring 15. In other words, the inside diameter $\phi D$ of the protruding portion 110 is set to be equal to or smaller than the inside diameter $\phi B$ of the small diameter side end portion 108 of the cupped raceway surface of the outer ring 15. In addition, the inside diameter $\phi D$ of the protruding portion 110 is set to be equal to or smaller than the outside diameter $\phi C$ of a front face rib 39 at a small diameter side of a coned raceway surface of an inner ring 16. In addition, the inside diameter $\phi E$ of a radially inward portion on an oil entry side edge portion of a cage 30 is made larger than the outside diameter $\phi C$ but smaller than the inside diameter $\phi B$. Additionally, the protruding portion 110 is disposed at a location which is spaced apart an interval i from the cage 30 in an axial direction of the inner ring 16. The axial interval i between the protruding portion 110 and the cage 30 is set to be 3 mm or smaller.

Note that according to experiments, in a construction like the third embodiment where the shielding plate is provided in such a manner as to be in abutment with an axial end face of the outer ring which lies a side where oil enters, when the inside diameter of the shielding plate was made larger than the inside diameter of the oil entry side end portion of the outer ring, the effect to control the entry of oil was reduced, and the effect to reduce the rotational torque was reduced. In addition, when the axial interval between the protruding portion of the shielding plate and the cage was increased to exceed 3 mm, irrespective of the inside diameter dimension of the shielding plate, the effect to control the entry of oil was insufficient, and the effect to reduce the rotational torque was reduced. On the contrary, as with the third embodiment, when the axial integral i between the protruding portion 110 and the cage 30 was set to be 3 mm or smaller with the relationship between $\phi B$, $\phi C$, and $\phi D$ made to result in $\phi D<\phi C<\phi B$, the rotational torque could be reduced remarkably and the sufficient lubricating properties could be secured.

According to the tapered roller bearing device of the third embodiment, the amount of oil which enters the inside of the bearing device can be reduced, and hence, the rotational torque can be reduced.

In addition, in the tapered roller bearing device of the third embodiment, the shielding plate 107 is fixedly fitted in the inner wall 19 in such a manner as to be brought into abutment with the end face of the small diameter side edge portion of the cupped raceway surface of the outer ring 17. In the invention, however, a gap may exist in the axial direction of the outer ring between the shielding plate and the end face of the small diameter side edge portion of the cupped raceway surface of the outer ring, and the shielding plate may not be in abutment with the end face of the small diameter side edge portion of the cupped raceway surface of the outer ring. In addition, a member may be disposed between the shielding plate and the end face of the small diameter side edge portion of the cupped raceway surface of the outer ring.

Fourth Embodiment

Figure 6:
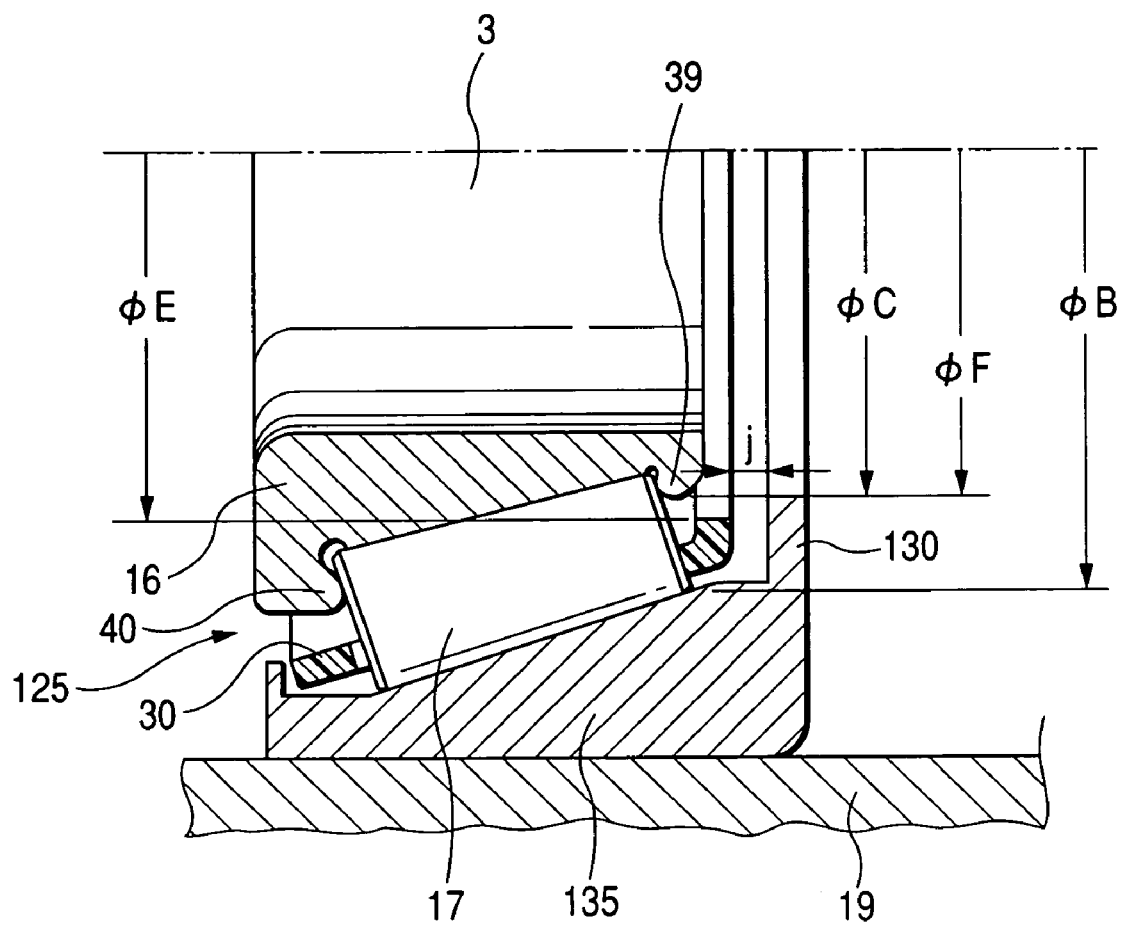
FIG. 6 is an axial sectional view of a tapered roller bearing device of a fourth embodiment of the fluid-lubricated tapered roller bearing device of the invention which corresponds to FIG. 2.

FIG. 6 is an axial sectional view of a tapered roller bearing device 125 of a fourth embodiment of the fluid-lubricated tapered roller bearing device of the invention which corresponds to FIG. 2.

In the tapered roller bearing device 125 of the fourth embodiment, like reference numerals are imparted to like constituent portions to those of the tapered roller bearing device 5 of the first embodiment, so as to omit the description thereof. In addition, in the tapered roller bearing device 125 of the fourth embodiment, the description of similar function and advantage and modified examples to those of the tapered roller bearing device 5, 105 of the first or third embodiment will be omitted, and hence, only different configurations and function and advantage from those of the tapered roller bearing device 5, 105 of the first or third embodiment will be described.

As shown in FIG. 6, an outer ring 135 of the tapered roller bearing device 125 of the fourth embodiment has a shape which is substantially the same as a shape into which the outer ring 15, the shielding plate 107 and the fluid accommodating plate 37 of the third embodiment are integrated. Specifically speaking, when compared to the shape into which the outer ring 15, the shielding plate 107 and the fluid accommodating plate 37 of the third embodiment are integrated, the outer ring 135 has a shape in which the height of a protruding portion 130 is lower which protrudes radially inwards from a small diameter side edge portion of a cupped raceway surface of the outer ring 135. As shown in FIG. 6, the inside diameter $\phi F$ of the protruding portion 130 is made substantially the same as the outside diameter $\phi C$ of a front face rib 39 formed at an oil entry side of an inner ring. An axial interval j between the protruding portion 130 and a cage 30 is set to be 3 mm or smaller. Note that in FIG. 6, $\phi B$ denotes the inside diameter of the small diameter side edge portion of the cupped raceway surface of the outer ring 135, and $\phi E$ denotes the inside diameter of a radially inward portion on an oil entry side edge portion of the cage 30.

According to the tapered roller bearing device 125 of the fourth embodiment, since the outer ring 135 has the shape which is substantially the same as the shape into which the outer ring 15, the shielding plate 107 and the fluid accommodating plate 37 of the third embodiment are integrated, the numbers of working manhours and assembling manhours can be reduced in the production process.

In addition, while the fluid-lubricated type tapered roller bearing device of the invention is preferably adopted for the pinion shaft supporting bearing of the vehicle pinion shaft supporting assembly such as the automotive differential, transaxle or transfer gearbox, the fluid-lubricated type tapered roller bearing device of the invention may, of course, be applied to bearings other than the pinion shaft supporting bearing. In particular, when the fluid-lubricated type tapered roller bearing device of the invention is applied to a bearing which is placed under the circumstances where a large amount of oil of a high viscosity flows in to thereby increase the agitating resistance, the agitating resistance can be reduced remarkably, thereby making it possible to reduce specifically the fuel consumption of a machine which is equipped with the fluid-lubricated type tapered roller bearing device of the invention.

What is claimed is:

1. A fluid-lubricated type tapered roller bearing device comprising:
   an outer ring;
   an inner ring disposed coaxially with the outer ring, the inner ring and the outer ring defining, at one axial end thereof, a first opening through which a lubricating fluid flows into a space between the outer ring and the inner ring and, at the other axial end, a second opening through which, the lubricating fluid flows out from the space;
   tapered rollers disposed between the outer ring and the inner ring;
   a fluid accommodating portion provided in a vicinity of the second opening for accommodating the lubricating fluid; and
   a cage which retains the tapered rollers,
   wherein the fluid accommodating portion includes a fluid accommodating plate which comprises a protruding portion which protrudes further inwards in a radial direction of the outer ring than an edge portion of a cupped raceway surface of the outer ring which lies on a large diameter side thereof, a fluid accommodating area in which the lubricating fluid is accommodated being defined at an inner side of the fluid accommodating plate with respect to the protruding portion in an axial direction,
   wherein the protruding portion of the fluid accommodating plate is disposed at a location which is spaced apart an interval from the cage outwards in the axial direction, and
   wherein an outward end face in the axial direction of the protruding portion of the fluid accommodating plate is positioned further inwards in the axial direction than an end face of an edge portion of the inner ring which lies on a large diameter side thereof.

2. The fluid-lubricated type tapered roller bearing device according to claim 1, wherein a distal end of the protruding portion of the fluid accommodating plate is positioned further inwards in the radial direction than an edge of an area of the cupped raceway surface of the outer ring which contacts outer circumferential surfaces of the tapered rollers which edge lies at a large end of the tapered rollers.

3. The fluid-lubricated type tapered roller bearing device according to claim 2, wherein the inner ring has a back face rib which contacts large end faces of the tapered rollers, and
   wherein the distal end of the protruding portion of the fluid accommodating plate is situated further outwards in the radial direction than the back face rib.

4. The fluid-lubricated type tapered roller bearing device according to claim 3, wherein
   the tapered rollers each have a recessed portion substantially at a center of the large end face thereof, and
   the distal end of the protruding portion of the fluid accommodating plate is situated further outwards in the radial direction than a most outward point in the radial direction of an edge of the recessed portion.

5. The fluid-lubricated type tapered roller bearing device according to claim 1, further comprising:
   a fluid entry control portion provided in a vicinity of the first opening for controlling an entry of the lubricating fluid.

6. A vehicle pinion shaft supporting assembly comprising:
   a case;
   a differential mechanism which is provided inside the case and which includes a ring gear;
   a pinion shaft including a pinion gear which meshes with the ring gear of the differential mechanism; and
   a fluid-lubricated type tapered roller bearing device which rotatably supports the pinion shaft, said fluid-lubricated type tapered roller bearing device comprising:
   an outer ring;
   an inner ring disposed coaxially with the outer ring, the inner ring and the outer ring defining, at one axial end thereof, a first opening through which a lubricating fluid flows into a space between the outer ring and the inner ring and, at the other axial end, a second opening through which the lubricating fluid flows out from the space;
   tapered rollers disposed between the outer ring and the inner ring;
   a fluid entry control portion provided in a vicinity of the first opening for controlling an entry of the lubricating fluid;
   a fluid accommodating portion provided in a vicinity of the second opening for accommodating the lubricating fluid; and
   a cage which retains the tapered rollers, and wherein:
   the inner ring comprises a rotating ring and the outer ring comprises a stationary ring;
   the inner ring includes a front face rib which contacts small end faces of the tapered rollers;
   the fluid entry control portion Includes a shielding plate having a protruding portion which protrudes radially further outwards than the front face rib; and
   the protruding portion of the shielding plate is disposed at a location which is spaced apart an interval from the cage outwards in an axial direction.

7. A vehicle pinion shaft supporting assembly comprising:
   a case;
   a differential mechanism which is provided inside the case and which includes a ring gear;
   a pinion shaft including a pinion gear which meshes with the ring gear of the differential mechanism;
   a fluid-lubricated type tapered roller bearing device which rotatably supports the pinion shaft, said fluid-lubricated type tapered roller bearing device comprising:
   an outer ring;
   an inner ring disposed coaxially with the outer ring, the inner ring and the outer ring defining, at one axial end thereof, a first opening through which a lubricating fluid flows into a space between the outer ring and the inner ring and, at the other axial end, a second opening through which the lubricating fluid flows out from the space;
   tapered rollers disposed between the outer ring and the inner ring;
   a fluid entry control portion provided in a vicinity of the first opening for controlling an entry of the lubricating fluid;
   a fluid accommodating portion provided in a vicinity of the second opening for accommodating the lubricating fluid; and
   a cage which retains the tapered rollers,
   wherein the fluid accommodating portion includes a fluid accommodating plate having a protruding portion which protrudes further inwards in a radial direction of the outer ring than an edge portion of a cupped raceway surface of the outer ring which lies on a large diameter side thereof, a fluid accommodating area in which the lubricating fluid is accommodated being defined at an inner side of the fluid accommodating plate with respect to the protruding portion in the axial direction, wherein the protruding portion of the fluid accommodating plate is disposed at a location which is spaced apart an interval from the cage outwards in the axial direction, and wherein an outward end face in the axial direction of the protruding portion of the fluid accommodating plate is positioned further inwards in the axial direction than an end face of an edge portion of the inner ring which lies on a large diameter side thereof.

* * * * *